United States Patent
Hausmann

(10) Patent No.: US 6,530,246 B1
(45) Date of Patent: Mar. 11, 2003

(54) METHOD AND DEVICE FOR FIBER IMPREGNATION

(76) Inventor: Joachim Hausmann, Kathe-Kollwitz-Strasse 9, Käiserslautern D-67659 (DE)

( * ) Notice: Subject to any disclaimer, the term of this patent is extended or adjusted under 35 U.S.C. 154(b) by 0 days.

(21) Appl. No.: 09/582,126

(22) PCT Filed: Nov. 10, 1998

(86) PCT No.: PCT/DE98/03361

§ 371 (c)(1), (2), (4) Date: Aug. 11, 2000

(87) PCT Pub. No.: WO99/33623

PCT Pub. Date: Jul. 8, 1999

(30) Foreign Application Priority Data

Dec. 24, 1997 (DE) .......................... 197 57 881

(51) Int. Cl.⁷ ................................. D06B 3/02
(52) U.S. Cl. ...................... 68/200; 68/202; 118/419
(58) Field of Search ................. 8/151; 118/258, 118/259, 260, 419; 68/202, 205 R, 200

(56) References Cited

U.S. PATENT DOCUMENTS

| 189,828 | A | * | 4/1877 | Woodcock |
| 637,565 | A | * | 11/1899 | Hett |
| 989,685 | A | * | 4/1911 | Zittle et al. |
| 1,009,922 | A | * | 11/1911 | Moch |
| 1,570,857 | A | * | 1/1926 | Perkins |
| 1,902,429 | A | * | 3/1933 | Wenzel |
| 2,333,369 | A | * | 11/1943 | Glickman |
| 2,428,965 | A | * | 10/1947 | Frisco et al. |

(List continued on next page.)

FOREIGN PATENT DOCUMENTS

| CH | 669227 | * | 2/1989 |
| DE | 214869 | * | 10/1984 |
| GB | 2084049 | * | 4/1982 |
| JP | 47-2067 | * | 2/1972 |
| JP | 53 028780 | | 3/1978 |
| WO | WO 95/25000 | | 9/1995 |

OTHER PUBLICATIONS

European patent application No. 173,432 May 1986.*

*Primary Examiner*—Frankie L. Stinson
(74) *Attorney, Agent, or Firm*—Killworth, Gottman, Hagan & Schaeff, L.L.P.

(57) ABSTRACT

The present invention relates to a method and a device for impregnating fibrous material such as, for example, fiber bundles, fiber strands, woven textiles or fiber mats, in which an impregnating agent is introduced into the spaces in the fibrous material, and the individual fibers are surrounded and/or soaked through, wherein the supply of impregnating agent takes place via apertures in a supply body over which the fibrous material is moved, wherein the device is provided with a supply body with apertures for supplying an impregnating agent, furthermore is provided with a transport means for moving the fibrous material through the device or respectively past the supply body, and means for supplying impregnating means to the supply body. In order to provide a method and a device which obtain a more complete and more uniform soaking through of the fibrous material, it is proposed according to the invention that supply takes place over a large area via a very large number of small apertures, in that a substantially homogeneous, porous or respectively permeable material is used for the supply body, and that correspondingly the supply body is composed of a substantially homogeneous, porous body which is permeable for the impregnating agent.

42 Claims, 8 Drawing Sheets

U.S. PATENT DOCUMENTS

| | | | |
|---|---|---|---|
| 2,464,040 A | * | 3/1949 | Huebner |
| 2,551,804 A | * | 5/1951 | Marasco |
| 2,622,313 A | * | 12/1952 | MacDonald |
| 2,623,496 A | * | 12/1952 | Lowell |
| 2,728,972 A | * | 1/1956 | Drummond et al. |
| 3,393,661 A | * | 7/1968 | Sharp |
| 3,401,542 A | * | 9/1968 | Evans |
| 3,421,926 A | * | 1/1969 | Davies et al. |
| 3,495,285 A | * | 2/1970 | Zimmer |
| 3,718,080 A | * | 2/1973 | Yamamoto et al. |
| 3,741,489 A | * | 6/1973 | Kawamura et al. |
| 3,924,028 A | * | 12/1975 | Benson et al. |
| 4,672,705 A | * | 6/1987 | Bors et al. |
| 4,894,105 A | * | 1/1990 | Dyksterhouse |
| 5,022,948 A | * | 6/1991 | Hallworth |
| 5,232,499 A | * | 8/1993 | Kato et al. |
| 5,267,004 A | * | 11/1993 | Mills |
| 5,569,326 A | * | 10/1996 | Ruhl |
| 5,798,068 A | * | 8/1998 | Vlug |

* cited by examiner

METHOD AND DEVICE FOR FIBER IMPREGNATION

BACKGROUND AND SUMMARY OF THE INVENTION

The present invention relates to a method and a device for impregnating fibrous material, wherein by fibrous material, fibre bundles or strands, woven textiles or also fibre matting is understood, wherein in the latter case the individual fibres or filaments are present in a random orientation. The fibrous material can be made of the most varied materials; glass, carbon or aramid fibres can be used, or natural fibres such as, for example, flax, jute, hemp or cotton fibres, or metal fibres such as steel, copper or aluminium fibres, or plastics fibres such as, for example, polyethylene, polypropylene or polyamide, or polyethylene terephthalate fibres can be used. The soaking or impregnating of such fibrous materials is an important step in the manufacturing of fibre-reinforced composite substances, in which a good cohesion between a matrix substance and the fibres is vital. This good cohesion is only made possible by as complete as possible wetting of the surface of the individual fibres.

In particular, the present invention relates to a method for impregnating fibrous material, in which an impregnating agent is introduced into the spaces in the fibrous material, and the individual fibres are coated and/or soaked through, wherein the impregnating agent is supplied via a supply body with one or more apertures, on which body the fibrous material is moved past in contact with the supply body or at a distance from it.

The corresponding device for impregnating fibrous material, upon which the present invention is based, is provided with a supply body with one or more apertures for the impregnating material and transport means for the fibrous material, by means of which the fibrous is moved through the device, or respectively on the supply apertures or respectively moved past the supply body.

Such a method and a corresponding device are known from DE 38 35 574, whereby in this an impregnating device is described in which a fibre bundle is conveyed via a nozzle, wherein a plastics flux is pressed through the fibre bundle, at a raised pressure, at right-angles to the direction of movement of the fibres, which fibre bundle is consequently soaked through. With this, impregnation is carried out substantially locally by bringing together the fibrous material and a nozzle in one place, where, because of the pressure of the impregnating material leaving the nozzle, the fibre bundle, or respectively the fibrous material, is interspersed relatively quickly by the impregnating agent.

In comparison, a method and a device are also known in which the supply is by means of a permeable supporting surface moved at the same speed along with the fibrous material. Such a method and a corresponding device are relatively complex because of the supporting surface also having to be moved and the matching of the speeds of the fibrous material and the supporting surface.

The method and device with local supply, even when the local supply of impregnating material is repeated on a plurality of occasions in a succession of positions, have the disadvantage that the soaking through of the fibrous material is often irregular and incomplete. For example, in the case of fibre bundles, it can happen that the fibre bundles are of different thicknesses when seen from right-angles to their longitudinal extent, and because of this the impregnating material penetrating in this direction of thickness can encounter a very different flow resistance. The impregnating material then flows preferentially through areas with low flow resistance, in certain conditions even separating the fibre bundle in this way, and only poorly soaks through the thicker areas of the bundle.

JP 984615 shows a device with a tube-shaped base body. A slit extending in a longitudinal direction is arranged in this tube-shaped base body. A sintered body is incorporated into this slit, through which sintered body the impregnating agent is supplied to the fibres.

Compared to this prior art, the object of the present invention is to provide a method and a device which achieve a more complete and uniform soaking through of the fibrous material.

With respect to the method, this object is solved in that a supply body of a permeable or porous material is used for the supply of the impregnating agent, over which body the fibrous material is moved along in a sliding manner.

Preferably, the permeable or respectively porous supply body has, when seen in the direction of flow of the impregnating material, a greater flow resistance than the fibrous material. It is clear that the flow resistance of the fibrous material is to be viewed as the same direction as that in which the impregnating material is pressed through the fibrous material, that is to say perpendicular to the contact surface of the permeable or respectively porous supply body.

A configuration of the method is preferred in which the supply of the impregnating agent is done under moderate pressure of, for example, at least 10 and at the most 500 bar in the case of thermoplastic impregnating agents, and 1 to 50 bar with duroplastic impregnating agents, measured on the side of the porous supply body opposite the fibrous material.

Furthermore, a configuration of the method according to the invention is preferred in which the dimensions of the supply body, that is to say in particular its porous surface, over which the fibrous material is passed, and the speed of movement of the fibrous material which is to be soaked through are matched with one another such that a given point of the fibrous material which is touching the contact surface of the supply body, remains touching this contact surface for at least 50 milliseconds (ms), thus actually requires at least 50 ms to be moved over the length of the contact surface, measured in the direction of movement of the fibrous material. In other words, when the fibrous material moves relative to the supply body at a speed of 50 mm per second, the length of the contact surface of the porous supply body would have to be at least 2.5 mm, and if the speed of the fibrous material is 500 mm per second, the corresponding length of the supply body would have to be 25 mm.

With the aid of the method according to the invention, duromer impregnating agents can be applied to fibres without any problems, which agents are then cured after impregnation of the fibres. Unexpectedly, it has been proved that even thermoplastic materials which have a substantially greater viscosity compared to duromers, can be applied very well through permeable or respectively porous supply bodies which have relatively small effective cross-section supply apertures, and possibly also relatively long supply channels to the fibres to be impregnated using the method according to the invention. Moreover, it has been established that the speed at which the fibrous material can move relative to the supply body can be increased substantially above the figures already described, as in many cases a contact time of 10 milliseconds is enough for sufficiently wetting the fibrous material to be impregnated or soaked through. The supply body can either be correspondingly shortened or the speed of supply of the fibrous material can be correspondingly increased, for example, to 1–5 m per second.

A particular application of the method according to the invention is disclosed in connection with the application of the impregnated fibres onto blank moulds. These can be, for example, rod or tube-shaped and the fibres can either be applied in the longitudinal direction of such a blank mould or be wound around it, at an angle which can in principle, be selected between 0° (corresponding to the longitudinal direction) and 90° (corresponding to wrapping in a plane perpendicular to the feed direction of the blank mould).

The blank mould can either be rotated or the supply means for the fibres is rotated together with a corresponding impregnating means around the blank mould, according to which variant proves more practically advantageous. In particular when the blank moulds are of a very great length, for example in the case of relatively long pipelines, it is often advantageous to arrange the impregnating and fibre supply means to be rotatable about the blank mould when it has to be wound with impregnated fibrous material. With shorter blank moulds such as, for example, short pipe sections or squares, the opposite method, of rotating the blank mould, is possibly more advantageous.

With other variants of the method according to the invention, the fibrous material is conducted through the inside of a hollow body which can admit the impregnating agent, wherein the hollow body is composed of the porous or respectively permeable material described.

The fibres can be conducted through a plurality of successive hollow bodies, in a multi-stage process, wherein at each hollow body a further, new fibre layer is applied and supplied to the existing impregnated fibre layer, which new layer is impregnated when passing through the respective next hollow body.

When wrapping, in particular a plurality of different groups of fibres can be wound simultaneously onto a blank mould, wherein by means of this method, either a larger winding width is obtained, so that the feed speed of the blank mould can be increased, or a plurality of layers of fibres can be wound one on top of another directly one after another. Clearly, the groups of fibres can also have, respectively, different fibrous materials.

A winding or applicator device is advantageously followed by an appropriate means, which in the case of duromer impregnating agents can be generally a heating means, an irradiating means or the like, for curing the duromer material, while in the case of a thermoplastic material only wiping, post-forming and cooling down takes place.

With respect to the device, the object of the invention is solved in that the supply body is composed of a substantially homogeneous, porous and respectively permeable body, wherein the porous body is provided such that it comes into contact with the fibrous material. Preferably, the flow resistance of the supply body for the impregnating material is greater than the flow resistance of the fibrous material perpendicular to the contact surface of the supply body. A substantially homogeneous, porous pr respectively permeable body is understood to be a supply body, the material of which continuously has the same chemical and physical properties, that is to say in every instance when viewed from areas which are clearly larger than the pores or apertures in the material. Advantageously, the apertures or pore sizes in the material of the supply body should also be distributed as homogeneously as possible and be of the same size, that is to say the size distribution of the individual pores should have only a slight degree of variation. Additionally, such a porous material should naturally be open-pored, thus allowing the desired permeability. For example, the supply body can be composed of a sintered material which is manufactured by sintering together a granulate material, preferably with a particle size of less than 1 mm. The average aperture size of the individual pores should be preferably not exceed 0.2 mm in diameter, wherein this optionally also allows the use of a sinter material with correspondingly finer particles.

Instead of a porous material or sintered material, the permeable or respectively porous supply body could also be made, for example, from a plurality of layers of a sufficiently dense woven textile or mesh, which is preferably manufactured from individual filaments which are advantageously scarcely wettable with the impregnating material. A perforated plate or the like could also be provided. Such a perforated plate could be produced by means of many fine bores in a material such as metal, ceramic or plastics. The diameter of the bore in this case is preferably between 1 and 5000 $\mu$m, preferably between 10 and 1000 $\mu$m, and their distance apart from one another is approximately 1 to 1000 $\mu$m. The preferred ratio of length to diameter of the bores is between 0.05–2000, preferably between 0.1 and 1000, in particular between 0.5 and 100.

Additionally, the supply body should preferably be composed of a material to which the impregnating agent adheres only with difficulty, or which is chemically resistant to solvents for the impregnating material.

It can also be advantageous when the contact surface of the supply body is intentionally configured as a surface with a low degree of sliding friction for the fibrous material. For example, the surface of the porous body which comes into contact with the fibrous material could be polished. This surface could also be selectively coated with a suitable slip material and, for example, be galvanised in order to reduce the friction between the fibrous material and the surface of the porous supply body. In many cases, however, the more or less abrasive fibrous materials ensure that an initially rough surface of a sintered body or other permeable body, is "ground" or respectively polished after a relatively short period of time.

The thickness of the porous supply body should be great compared to the thickness of the fibrous material to be soaked through, and be at least double the latter, in each case measured in the direction of flow of the impregnating material, so that the substantial pressure loss along the porous body occurs, and the wetting front in the fibrous material proceeds as regularly as possible throughout the thickness of the fibrous material, even when the fibres in the fibrous material are arranged with different density.

The corresponding device separately has the means which are necessary for carrying out the method steps described hereinabove. One of the variants of the device according to the invention is in the configuration of a porous and respectively permeable supply body as a hollow body, wherein the fibres are conducted through the inside of this hollow body and the impregnating agent is applied to the hollow body from the outside, which agent penetrates the wall of the hollow body into the inside. Advantageously, the intake area of such a substantially cylindrical or otherwise contoured hollow body is configured as convex in the direction in which the fibres run, that is to say as a more or less funnel-shaped or trumpet-shaped intake area.

In order to apply the fibrous material to a blank mould, in a preferred variant of the invention, a holder is provided for the blank mould, which is moveable relative to an impregnating means along an axis. In this way the impregnated fibres can be applied to the blank mould in the longitudinal direction. When the blank mould is simultaneously rotated, for which, in a corresponding embodiment an appropriate rotating means is provided, the fibres are wound onto the blank mould, at an angle relative to the direction of advancement of the blank mould, the tangent of which corresponds to the relationship of the speed of rotation at the periphery of the blank mould to the speed of advancement, and which is therefore substantially adjustable between 0° and 90°. Instead of rotating the blank mould, which can cause difficulties under some conditions with very long blank moulds, which are manufactured in principle as endless material, a winding device can also be provided by means of which a fibre supply means is arranged to rotate with the corresponding impregnating means around the blank mould.

A plurality of fibre supply means can also be provided to rotate independently of one another or together with one another around the blank mould. Independently rotatable fibre supply means allow different layers of fibres to be applied to the blank mould at different angles relative to the direction of advancement. A plurality of fibre supply means can each have their own impregnating means which is rotatable together with the supply means; optionally, however, a common impregnating means can be provided when the fibre supply means rotate together and the impregnating device is also provided to rotate correspondingly.

In the preferred embodiment, the porous and respectively permeable body is a sintered material manufactured from a sinter powder with a particle size in the range between 0.1 and 1000 $\mu$m, preferably in the range between 10 and 500 $\mu$m. The thickness of such a porous sintered body should be, in the preferred embodiment of the invention, at least 1 mm, preferably 2, and particularly preferably more than 5 mm. This produces effective supply channels through the porous sintered body, the ratio of length to diameter of which (wherein this is based on an average diameter of the channels) is in the size order of 10 to 1000. The exact ratio of length to diameter and also the absolute average diameter of the supply channels depends very greatly upon the impregnating agent, wherein very viscous materials tend to form a larger free supply cross-section through the individual channels. In particular, a permeable body could also be manufactured, for example, in which an appropriate metal plate or otherwise shaped supply body could be provided with very fine bores of less than 1 mm diameter with the aid of a laser, for example with bores of 0.2 to 05 mm diameter. Several meshes, gratings or woven textiles of metal or other materials could also be used as porous, permeable supply bodies.

It has been unexpectedly proved that porous sintered bodies manufactured from sinter grains with an average diameter of less than 500 $\mu$m are also extremely suitable for impregnating using thermoplastic materials, even when the effective supply channels have a ratio of length to diameter in the size order of 100. This is probably because, inter alia, these highly viscous, thermoplastic materials are as a rule non-Newtonian liquids, that is to say their viscosity changes with the respective flow conditions, and can even reduce at high relative speeds.

According to the basic concept of the invention, a fibrous material, that is to say one or more bundles of fibres or respectively a woven textile or also a fibre mat, is conducted over a permeable or porous material or respectively a permeable or porous body. The fibres and the porous body are in contact with one another, wherein this can be achieved either by applying an opposing body, for example a press roller or a press shoe, or by producing a suitable tension in the fibrous material and by suitable shaping of the porous body and corresponding guiding of the fibrous material. A fluid or respectively a flux is fed through the porous body. At the place where the flux or respectively the fluid emerges, where the fibrous material is in contact with the porous body, the flux or respectively the fluid directly penetrates the fibrous material and soaking through takes place. In contrast to the prior art, the soaking though or respectively impregnation takes place continuously during the entire time the material is running over the surface of the porous body. At the same time, a relative movement between the fibrous material and the porous body takes place. The method according to the invention and the corresponding device are not only suitable for low viscosity fluids or fluxes, but can also be satisfactorily configured for higher viscosity materials in that, for example, the supply pressure is increased and/or the permeability and if necessary the pore size of the porous or respectively permeable body is increased. With respect to the manner of functioning of the present invention, the relatively long contact time of the fluid or respectively flux emerging continuously at a slight pressure and the fibrous material appears in particular to be positive, and the fibrous material can, in this way, be very uniformly soaked through.

Naturally, different features of the embodiments described, and yet to be described, are independent of one another, and can also be used with methods and a device not using a supply body with a large number of small apertures. This is the case, for example, for the winding device to be described in more detail hereinafter, the supply of impregnating agent in a hollow body from the outside to the inside, and other features which are recognisable to the skilled person as independent from the special supply body.

Further advantages, features and possibilities for application of the present invention will be evident from the following description of a preferred embodiment and of the attached drawings. There is shown, in:

DETAILED DESCRIPTION

Figure 1:
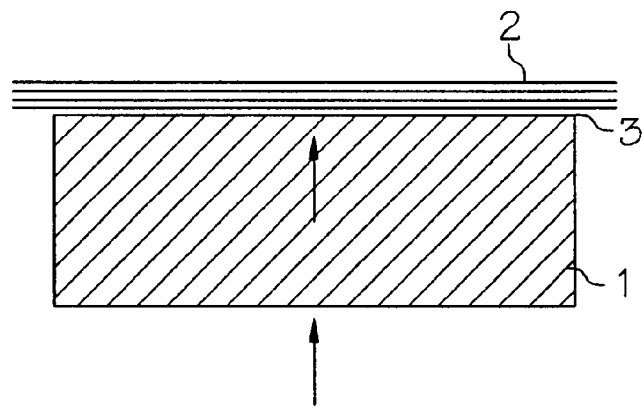
FIG. 1 schematically, a longitudinal section through a porous body and a fibrous material passed over it, FIG. 2 a cross-section view of the porous body according to the invention, FIG. 3 a sectional view through a cylindrical supply drum with fibrous material passed over it, FIG. 4 an alternative configuration of a device according to the invention with press elements, FIGS. 5 to 7 a further embodiment of a substantially cylindrically supply body from different views, FIG. 8 a double impregnating device with a following winding device, FIG. 9 an embodiment similar to FIG. 8, however with a single impregnating means and an irradiating means 8, FIG. 10 schematically, the manufacturing method of so-called "pultrusion", FIG. 11 a section of an impregnating device similar to FIG. 7, FIG. 12 a section through the "pultrusion" tool labelled 16 in FIG. 10, FIG. 13 a similar "pultrusion" tool in longitudinal section, FIG. 14 a winding device in a side view, with three groups of fibres and separated impregnating means, and FIG. 15 a winding device in cross-section with three groups of fibres and separated impregnating means, and FIG. 16 an embodiment similar to that of FIGS. 14 and 15, however with a common impregnating means for all three groups of fibres.

In FIG. 1 there is shown schematically and in longitudinal section a porous impregnating body 1, and a fibrous material 2 passed over the porous body 1. With this, the fibrous material 2 slides along the contact surface 3 on the porous base body. This contact surface 3 can be specially configured for the fibres sliding over it, that is to say in can in particular be polished or coated in order to prevent tearing or attachment of the individual fibres on the individual apertures or pores. The contact surface can also remain untreated, in particular when relatively hard, abrasive fibres are used which, after a very short period of passing over a corresponding contact surface, grind and smooth it. The porous body 1 is preferably a sintered body, that is to say it is preferably sintered together from a fine grained granulate material into a solid part.

Black arrows indicate the flow direction of a fluid, for example, a polymer flux, which penetrates the porous body 1 from beneath, and then permeates along the contact surface 3 into the fibrous material 2. Assuming that the fibrous material 2 in FIG. 1 moves forward from left to right, in the left-hand area of FIG. 1, which corresponds, for example, to the start of the porous body 1, at first only the bottom-most layer of fibres of the fibrous material 2 is touched and soaked through by the impregnating agent, wherein the permeation front of the flux or other impregnating fluid progresses over time ever further in the direction of the arrows, wherein at the same time the fibrous material is also moved to the right, with the result that the permeation front rises from the left to the right, and has finally touched the whole of the fibrous material 2.

Figure 2:
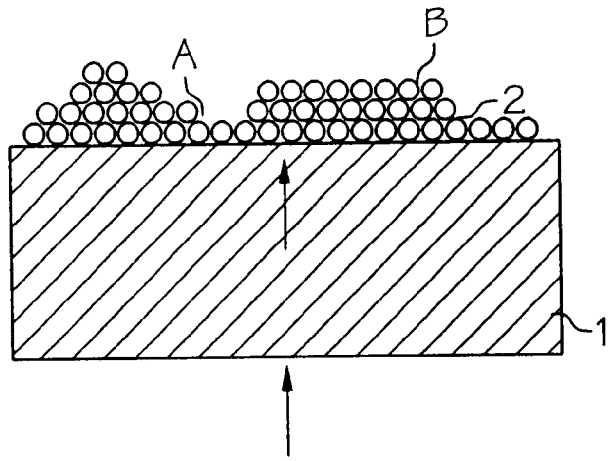

FIG. 2 shows a cross-section through a fibrous material 2 of more or less parallel fibres conducted over a porous body 1. As is evident, the fibres in area B are higher and packed into a thicker layer than in area A. The penetration of the fibrous material 2 with impregnating agent permeating from below through the porous body is nevertheless very uniform, in particular when the flow resistance provided through the porous body 1 is clearly greater than the flow resistance offered by the fibre bundle, and also in particular the thicker area B thereof.

Figure 3:
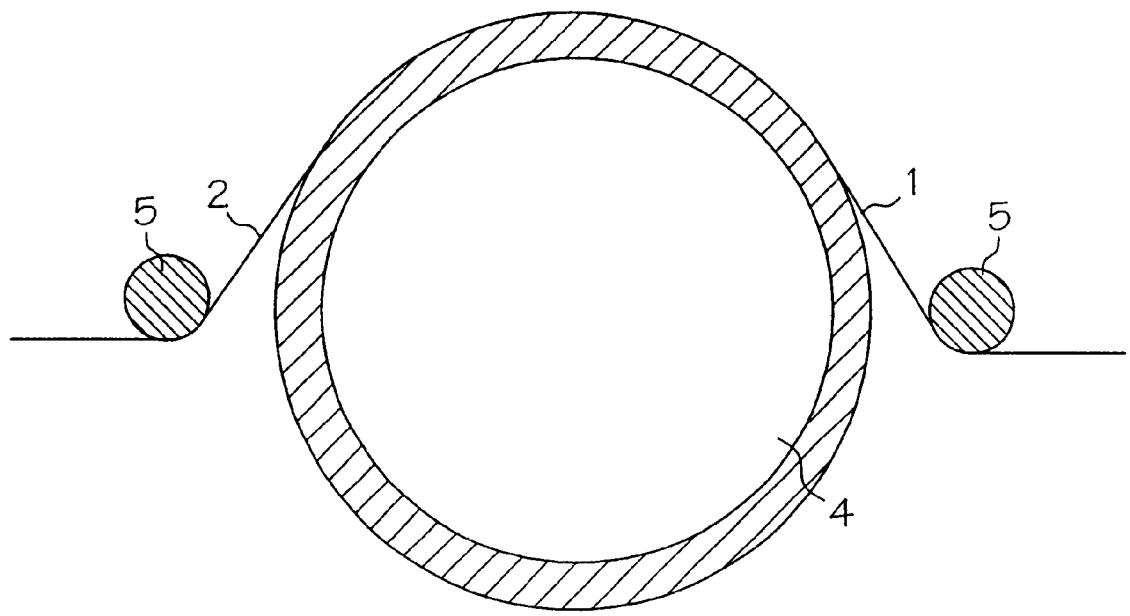

FIG. 3 shows a preferred embodiment of the present invention with a cylindrical, porous body 1, which has a cylindrical hollow space which is filled with a flux or other impregnating liquid 4 at an over-pressure.

By conducting a fibrous material 2 with the aid of guide elements in the form of a reel or roller 7 over a section of the cylindrical surface of the porous body 1, firstly a relatively long application length is obtained, a correspondingly long retention time of the fibrous material in contact with the impregnating agent delivered, and contact of the fibrous material on the surface of the porous body 1 with, preferably adjustable, tensioning of the fibrous material.

By means of relative movement and the uniform, large area flowing of the liquid, this material is distributed very uniformly and homogeneously between the fibres in both the longitudinal and transverse direction, and the fibres are in this way completely wetted.

The hollow cylindrical body 1 can selectively also be provided rotating about a central axis, also in the opposite direction to the direction in which the fibres run, in order to be able to adjust, independently of the retention time of the fibrous material 2 on the cylindrical arc extending over 180°, the relative speed between the surface of the cylindrical porous body 1 and the fibrous material 2, in order to obtain an optimum penetration.

Figure 4:
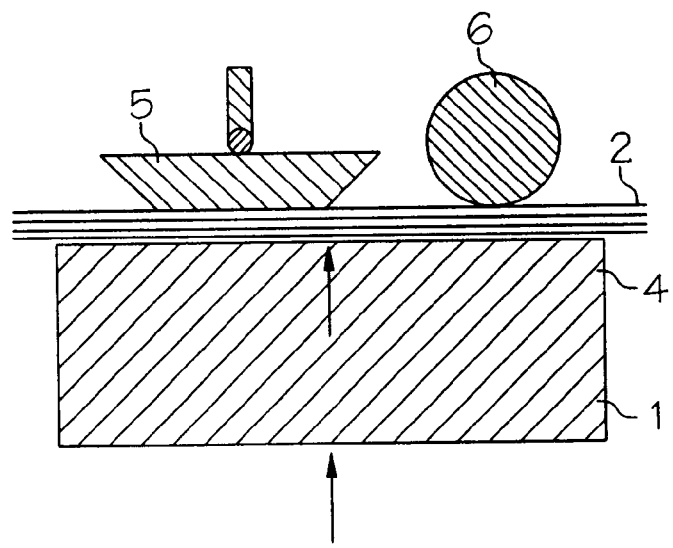

FIG. 4 shows schematically alternatives or supplements to the embodiment according to FIG. 3. While in FIG. 3 the fibrous material 2 lies, because of its natural tension or tension applied to it, closely on the surface of the cylindrical, porous body 1, whereby the reel or roller 7 and optionally the winding device can be provided on one end and a braking means for the fibrous material 2 on the other end, which are, however, not shown in FIG. 3, the embodiment according to 4 alternatively has a press shoe 5 and/or a press roller 6. The press shoe 5 and press roller 6 are preferably elastically resilient and mounted pre-tensioned in the direction of the fibrous material 2. This avoids a considerable part of the impregnating agent pouring out sideways when the fibrous material 2 is lifted from the surface of the porous body 1, and remaining unused. The porous body 1 shown here only schematically can have a planar surface or also a cylindrically curved surface as in the embodiment of FIG. 3, wherein a press shoe 5 is optionally matched to the corresponding curvature of the cylindrical surface, optionally having a slightly larger radius.

Figure 5:
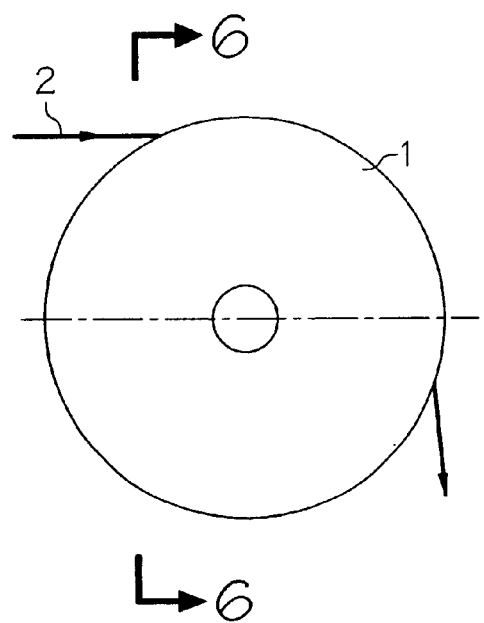
Figure 6:
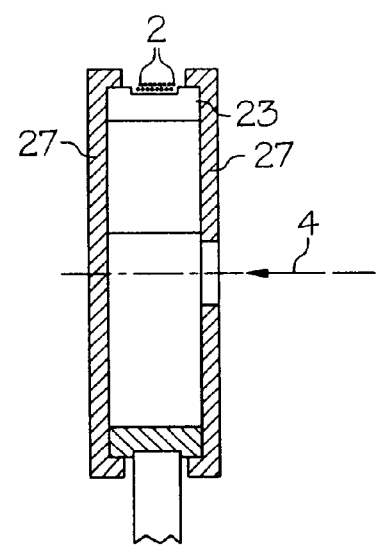
Figure 7:
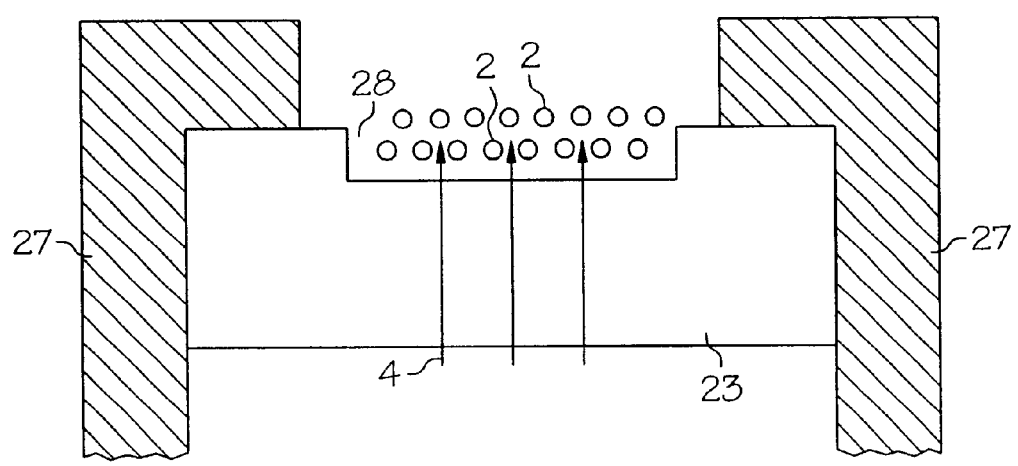

In FIG. 5, in the side view, a substantially cylindrical supply body 51 is again evident, to which a strand of fibrous material 2 is supplied. It should be noted that the fibrous material 2 is moved in a sliding manner over the surface of the cylindrical supply body 51, which body has a construction evident in FIG. 6. In concrete terms, the supply body 51 is composed of a ring 23 of a porous or respectively permeable material, in the present instance of a sintered material, wherein this ring is enclosed by two end flanges 27 which also grip around the periphery of the ring 23 in the proximity of its end faces. In FIG. 7 a section from FIG. 6 is shown again in detail. It is evident that the ring 23 has another circumferential guide groove 28 for receiving and guiding a fibrous material 2. As is also evident in FIG. 7, the impregnating agent 4 is pumped in centrally through one of flanges 27 and into the inside of the hollow space enclosed by the ring 23 and the flanges 27, and at a pressure which can vary, according to the impregnating agent used, in wide ranges between a few bar and several hundred bar. The impregnating agent from the hollow space penetrates the porous body 23 and, because of the relative movement between the fibrous material 2 and the surface of the ring 23, is directly wiped from the apertures on the outer surface of the ring 23 and in this way wets the fibrous material through in a very effective way. It has been proved that in the case of using sintered material for the porous ring 23 without surface treatment, although its surface is relatively rough at first, and under certain conditions damages the fibrous material 2, the surface of this porous sintered body 23 is, however, smoothed in a relatively short time by the fibrous material 2 alone, in particular when it is composed of a hard, relatively abrasive material such as, for example, glass fibres or carbon fibres. The surface of the ring 23, to the extent that it touches the fibrous material 2, is then polished in a short time such that damage to the fibres no longer occurs, but they are, as previously, well wetted in a very effective manner even with relatively short contact times and high relative speeds between the fibres and ring 23.

Figure 8:
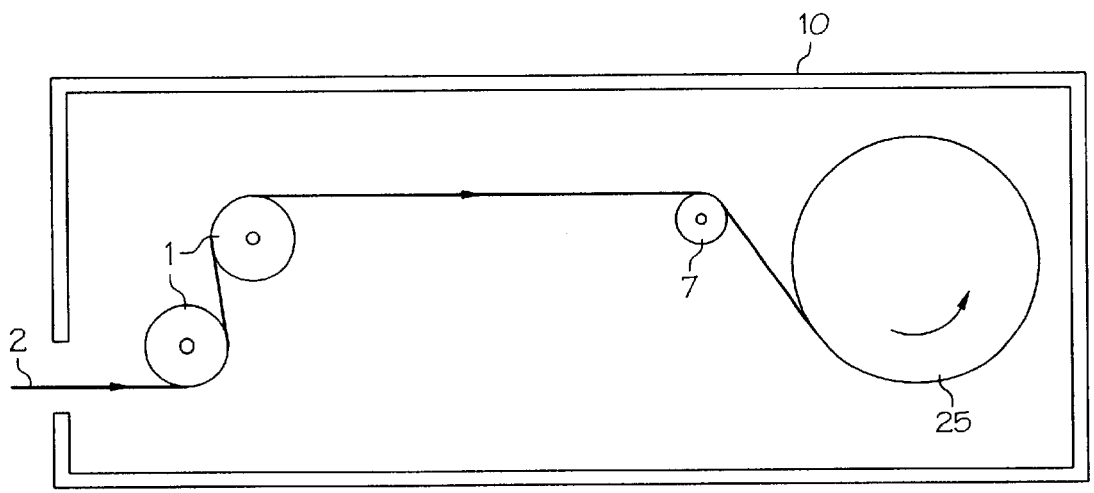

In FIG. 8 two such impregnating bodies 1 in the form of rings 23 are shown, over which rings the fibrous material 2 is conducted in an S-shape, in order to obtain a particularly effective wetting of both sides of the fibre strand. Such a variant is particularly advantageous when the fibrous material 2 is relatively thick and possibly cannot be sufficiently quickly soaked through from one side. After impregnation, the fibrous material 2 is conducted over a reel or roller 7 and from there onto a rotating, cylindrical blank mould 25. With this, either the guide roller 7 can be moveable together with or without the impregnating body in an axial direction in order to coat different sections of the blank mould 25, or instead, however, the blank form 25 can be moveable in its longitudinal direction past the supply reel 7. The entire apparatus is arranged in a heatable housing 10 in order to keep a thermoplastic supply material sufficiently liquid or respectively plastically malleable during impregnation and still also during winding onto the mould.

Figure 9:
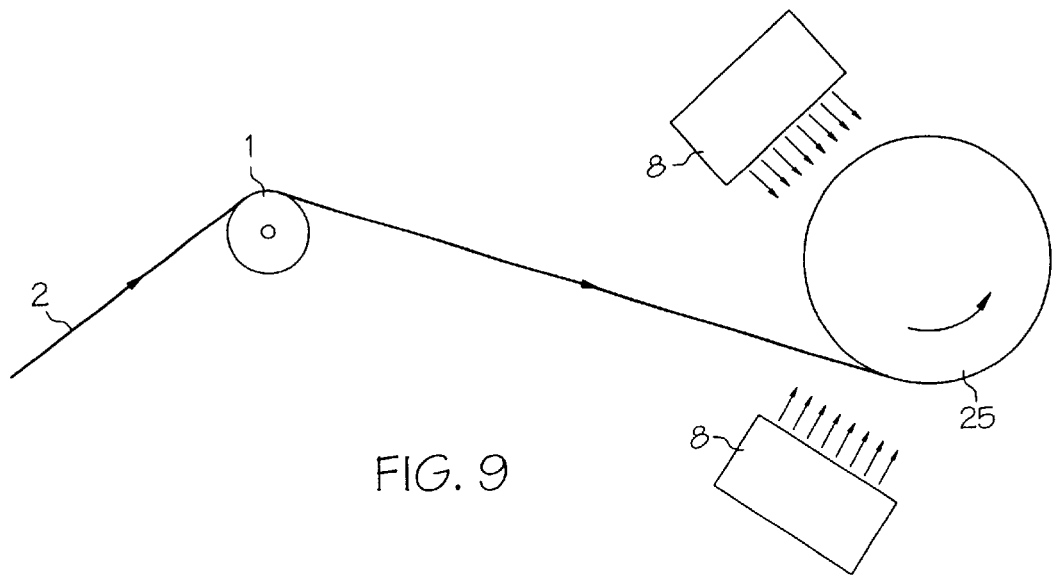

In FIG. 9 only a single impregnating body 1 is shown, over the surface of which a fibrous material 2 to be impregnated is passed. Naturally, the supply body shown generally cylindrically in the Figures, does not necessarily have to have a cylindrical cross-section, as the fibrous material is only passed over a limited section of the periphery of this cylinder, at least when the cylinder is, in particular, not provided as rotating. Certainly, after wear on some sections of the surface, the supply cylinder can be rotated far enough for a new, as yet unworn, surface of the cylindrical supply body 1 to come into contact with the fibrous material 2.

In the embodiment according to FIG. 9 there are provided in addition two irradiating means 8, by means of which the surface of the wound blank mould is irradiated, and this can be UV irradiation or heat radiation, by means of which, for example, a duromer impregnating agent is cured after winding onto the blank mould 25, or a thermoplastic impregnating agent is kept liquid or respectively plastically malleable. The heating or respectively irradiating means 8 can be offset in the axial direction with respect to the straight wound strand section.

Figure 10:
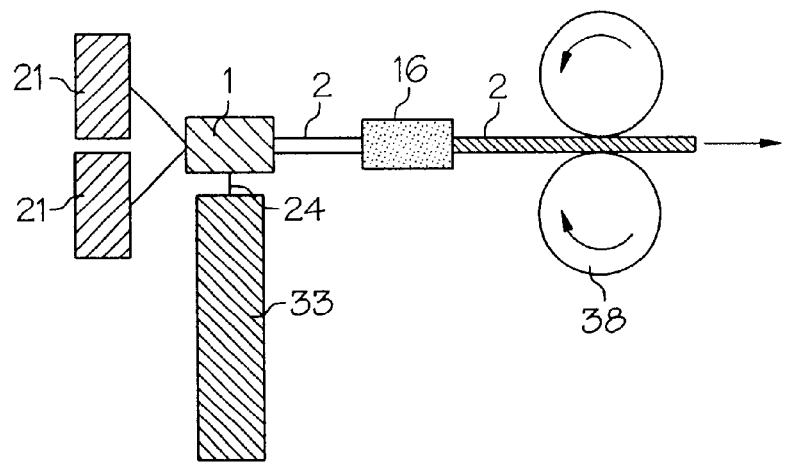

In FIG. 10 are method and a device are shown schematically, which are described in the industry as "pultrusion" and respectively a pultrusion device. The corresponding device is composed of a fibre supply means 21, an impregnating means 1, a stock of impregnating agent 33 which is supplied via a line 24 belonging to the impregnating device 1, a consolidating and/or shaping tool 16, also described as a pultrusion tool, and a drawing device 38 in the form of two reels or rollers through which the impregnated and shaped fibrous material 2 is drawn. Naturally, the impregnating device S1 can also be directly connected to the shaping tool 16.

Figure 11:
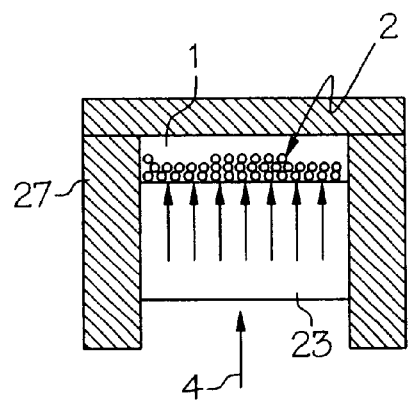

The impregnating device 1 is shown by way of example in FIG. 11. A supply body 23' can be constructed similarly ring-shaped with flanges 27' as, for example, in the case of the variant shown in FIGS. 5 to 9, but can also have a different shape.

Figure 12:
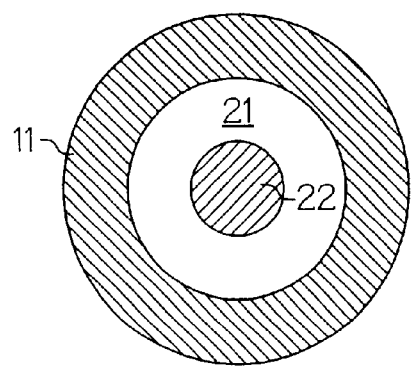

The impregnated fibrous material 2 is subsequently conducted through the pultrusion tool 16, the cross-section of which is shown by way of example in FIG. 12. Naturally, the core 22 must have a mounting leading out of the external cylinder 11, which mounting extends either axially through the entire core of the material 2 and also through the impregnating device 1, or is made to emerge laterally from the material 2, wherein at the intake of the pultrusion tool 16 additional guiding means can be provided which force the fibres of the material 2 into a uniform distribution about the core 22. Naturally, the inside diameter of the cylinder 11 and also the outside diameter of the core 22 do not necessarily have to be circular, and that in this way the impregnated fibre bundle which runs through the space 12 between the core 22 and jacket 11 can be given a corresponding cross-section shape. The correspondingly shaped fibrous material 2 is conducted through a drawing tool in the form of two rollers 38, the external surface of which rollers can clearly also be adapted to the external cross-section of the shaped fibrous material 2.

Figure 13:
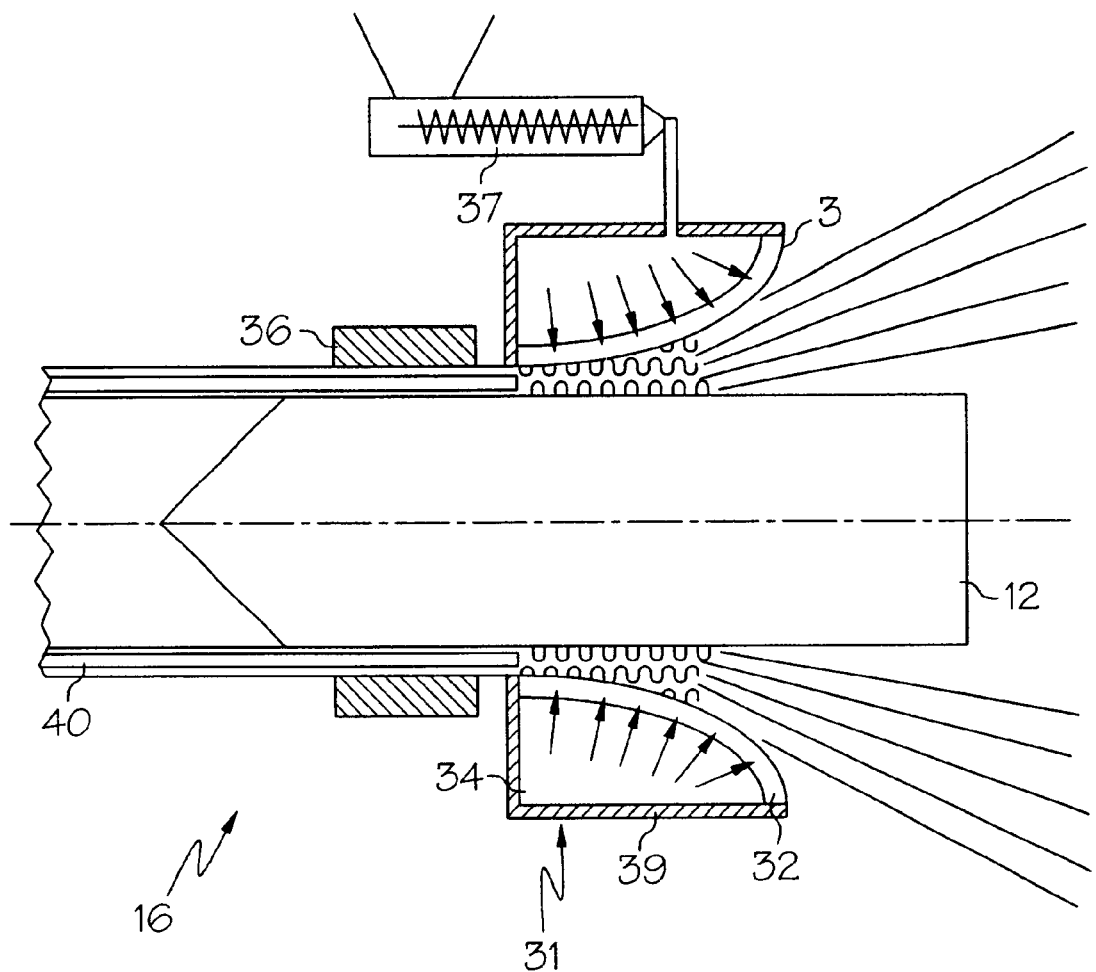

In FIG. 13 there is shown in longitudinal section a pultrusion tool 16' which is provided with a hollow, annular supply body 31, the porous internal wall 32 of which is convexly curved on the intake side and consequently in this intake area is funnel or respectively trumpet-shaped. An external wall 39, L-shaped in cross-section, seals off a hollow space 34 for receiving an impregnating agent, or respectively a flux, from the outside. A supply line or respectively an extruder 37 provides the hollow space 34 with impregnating agent under pressure, which impregnating agent is pressed through the supply channels configured in the porous internal wall 32 in the direction of the outside surface 3 of said wall 32, and it is taken up there by the fibres of a fibrous material 2. The fibrous material 2 coming from the outside runs convergently into the intake side of the supply body 31 and along its convexly curved internal surface 3. Through the inside of the supply ring 31 there extends centrally a core or rod 22 so that the fibrous material 2 must run between the outside surface or said core and the surface of the inside wall 32 of the ring 31, in intimate contact with this surface. A calibrating ring 36 connecting onto the supply ring 31 smooths the external surface of the fibrous material soaked through with flux or respectively impregnating agent, so that on the left-hand side, beyond the core 22, the soaked fibrous material 2 forms a tube 40.

Instead of a core 22, a blank mould could also extend through the supply ring 31 and be moved together with the fibres through the supply ring 31, which fibres could in this way be applied to the blank mould. Naturally, regardless of this, further layers of fibres could be wound beforehand or later onto the blank mould or respectively onto the blank form already coated with fibres.

Figure 14:
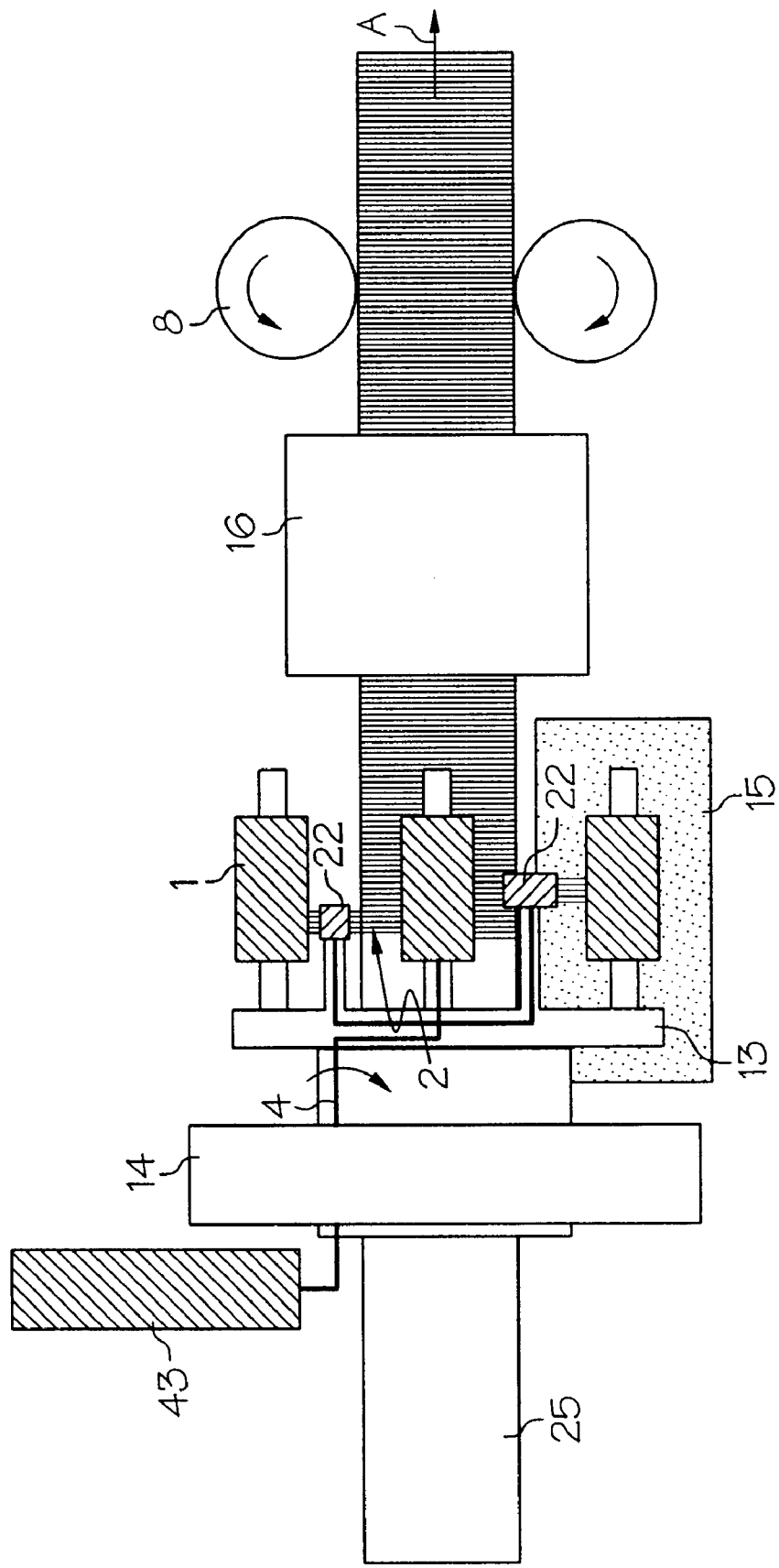

In FIG. 14 a winding device for applying a winding onto a rod or cylindrically-shaped blank mould is shown. The blank mould 25 is moved according to the arrow A from left to right through the device. With this, the fibrous material 2 which is soaked through with the impregnating agent by means of impregnating means 51, is wound onto the blank mould 25. The impregnating agent is conducted from a storage container or extruder 43 by means of a rotary transmission 13 to the individual impregnating means 51. A rotary drive 14 rotates the rotary transmission 13, which serves at the same time as the mounting for the rotatably suspended supplies 1 for the fibrous material 2, about the axis of the blank mould 25 which can be drawn by means of the calibrating ring 36. The calibration can be used with appropriate heating for calibration 36, wherein by means of appropriate cooling, cooling to room temperature can result. This is the case in particular for thermoplastic impregnating agents. For duroplastic impregnating agents, the calibration 36 can be employed for curing the impregnating agent by heat or irradiation.

Figure 15:
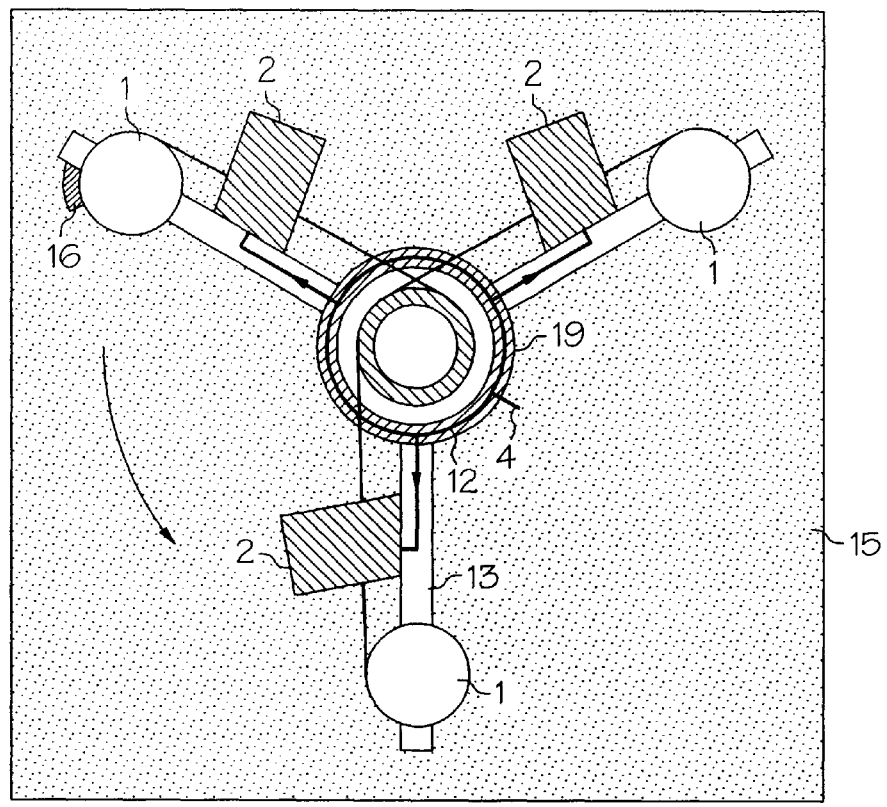

The same apparatus is shown again in FIG. 15, in a section through the winding device in plan view from the right. In the centre, the blank mould 25 is shown in the form of a tube which is conducted axially, that is to say perpendicular to the plane of the paper, through a rotating rotary transmission 13. The rotary transmission 13 with stock of fibrous material 2 and impregnating device 51 rotates around the blank mould 25. This apparatus can be located in a heated chamber 10.

The impregnating agent 4 is distributed via the supply lines 24 into the impregnating device 51. The fibrous material 2 can be braked by a tensioning device 15 in order to ensure contact of the fibrous material 2 on the porous or respectively permeable part 1 of the impregnating device 51.

Figure 16:
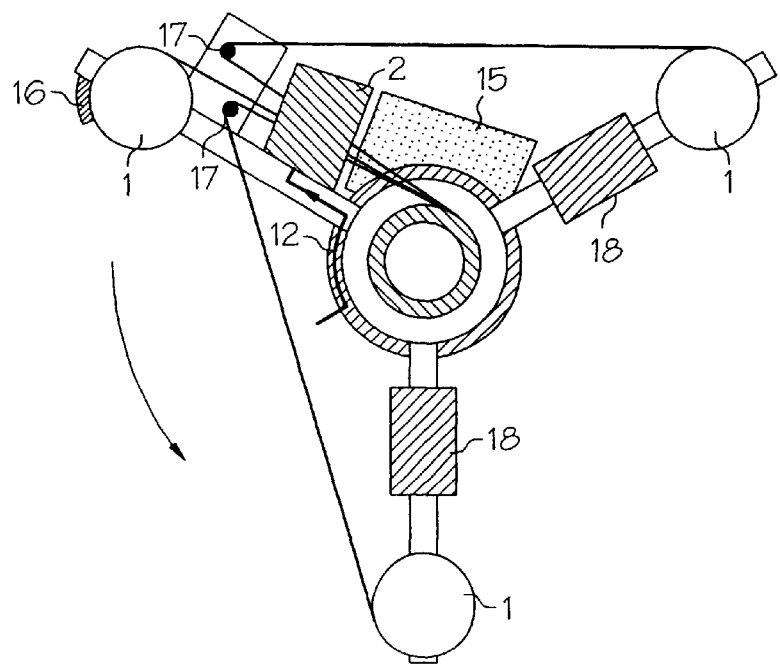

In FIG. 16 the winding device is again evident in plan view, wherein in contrast to the representation in FIG. 15, there is only one impregnating device 51, wherein the fibrous material 2 which can be braked by a tensioning device 15, and slides around through the guiding devices 7, is conducted through a single impregnating device 51. With this, the heated housing 10 can only cover the area where the impregnated fibrous material 2 meets the body to be wound. Fast and uniform rotation of the winding device can be ensured by the compensating body 18.

Having described the invention in detail and by reference to preferred embodiments thereof, it will be apparent that modifications and variations are possible without departing from the scope of the invention defined in the appended claims.

List of designations 1 porous impregnating body
2 fibrous material
3 contact surface of the impregnating body
4 impregnating liquid
5 guide reels
5 press shoe
6 press roller
1 cylindrical supply body
2 fibrous material strand
3 ring of porous material
7 end flange
1 impregnating ring or cylinder
7 reel or respectively roller/guide reel
10 housing
1 supply cylinder
3 supply body
8 irradiating means
5 blank mould
1 fibre supply means
12 impregnating means
13 impregnating means (stock)
14 line
16 consolidating and/or shaping tool
18 drawing device
17 consolidated or respectively shaped fibre strand
5 impregnated fibre strand
6 pultrusion tool
3 supply body
12 core
11 outer cylinder
15 strand
21 space
3 storage container for impregnating agent
13 rotary transmission
14 rotary drive

What is claimed is:

1. A device for impregnating fibrous material comprising:
a fibrous material;
an impregnating agents, wherein the impregnating agent is introduced into spaces in the fibrous material, and the individual fibers are surrounded and/or soaked through; and
a supply body formed of a substantially homogeneous, porous or respectively permeable material,
wherein the supply of the impregnating takes place via aperture in the supply body, wherein the supply takes place over a large area via a very large number of small apertures, wherein said fibrous material is moved over the supply body in a sliding manner, wherein through-flow resistance of the porous or respectively permeable body for the impregnating agent is greater than the through-flow resistance through the fibrous material at right-angles to its direction of movement.

2. A device for impregnating fibrous material comprising:
a fibrous material;
an impregnating agent, wherein the impregnating agent is introduced into spaces in the fibrous material, and the individual fibers are surrounded and/or soaked through; and
a supply body formed of a substantially homogeneous, porous or respectively permeable material,
wherein the supply of the impregnating takes place via apertures in the supply body, wherein the supply takes place over a large area via a very large number of small apertures, wherein the fibrous material is moved over the supply body in a sliding manner, wherein the impregnating agent is conducted onto the side of the supply body opposite the fibrous material at an over-pressure of at least one bar.

3. A device according to claim 1 wherein said impregnating agent adhering to the side of the fibrous material opposite the supply body is wiped off after the passing of the supply body.

4. A device according to claim 1 wherein said impregnating agent comprises a duromer plastics material.

5. A device according to claim 1 wherein said impregnating agent comprises a thermoplastic material.

6. A device according to claim 1 wherein after impregnation, the fibrous material is applied to a blank mold.

7. A device according to claim 6, wherein said blank mold comprises a tube or rod-shaped element.

8. A device according to claim 7, wherein the fibers are applied to the tube or rod-shaped body substantially parallel to the longitudinal direction thereof.

9. A device according to claim 7, wherein the fibers are wound onto the tube or rod-shaped body at an angle of >0 and a maximum 90° to its longitudinal axis.

10. A device according to claim 6, wherein the blank mold is rotated relative to a stationary winding device by means of which impregnated fibers are supplied.

11. A device according to claim 6, wherein a winding device is arranged to rotate around the blank mold is used.

12. A device according to claim 10, wherein a plurality of groups of fibers are supplied separately by means of the winding device.

13. A device according to claim 12, wherein the separated groups of fibers pass through a common impregnating device.

14. A device according to claim 12, wherein each group of fibers passes through an impregnating means specially assigned to it.

15. A device according to claim 1 wherein said fibrous material is selected from the group consisting of fiber bundles, fiber strand, woven textiles, and fiber mates.

16. A device according to claim 1 wherein the relative speed between the fibrous material and the porous supply body is adjusted depending on the length of the contact surface between the fibrous material and supply body such that, when sliding over the porous body, the duration of contact of any point of the fibrous material on the surface, and respectively the supply area, of the porous body, is at least 10 milliseconds.

17. A device for impregnating fibrous material comprising:
- a fibrous material;
- an impregnating agent, wherein the impregnating agent is introduced into spaces in the fibrous material, and the individual fibers are surrounded and/or soaked through; and
- a supply body formed of a substantially homogeneous, porous or respectively permeable material,
- wherein the supply of the impregnating takes place via apertures in the supply body, wherein the supply takes place over a large area via a very large number of small apertures, wherein the fibrous material is moved over the supply body in a sliding manner, wherein the fibrous material is conducted through the inside of a hollow body, to the outside of which body the impregnating agent is applied, and in contact with the walls thereof.

18. A device for impregnating fibrous material comprising:
- a fibrous material;
- an impregnating agent, wherein the impregnating agent is introduced into spaces in the fibrous material, and the individual fibers are surrounded and/or soaked through; and
- a supply body formed of a substantially homogeneous, porous or respectively permeable material,
- wherein the supply of the impregnating takes place via apertures in the supply body, wherein the supply takes place over a large area via a very large number of small apertures, wherein the fibrous material is moved over the supply body in a sliding manner, wherein the fibrous material is conducted through the inside of a hollow body, to the outside of which body the impregnating agent is applied, and in contact with the walls thereof, wherein a plurality of impregnating stages are arranged one after another, and fibers already impregnated are guided out of a first impregnating stage within fibrous which, in a second or further impregnating stage, are conducted through a further hollow body and impregnated.

19. A device for impregnating fibrous material comprising:
- a fibrous material;
- an impregnating agent, wherein the impregnating agent is introduced into spaces in the fibrous material, and the individual fibers are surrounded and/or soaked through; and
- a supply body formed of a substantially homogeneous, porous or respectively permeable material,
- wherein the supply of the impregnating takes place via apertures in the supply body, wherein the supply takes place over a large area via a very large number of small apertures, wherein the fibrous material is moved over the supply body in a sliding manner, wherein after impregnation, the fibrous material is applied to a blank mold, wherein the blank mold is composed of an impregnated and optionally consolidated fibrous material.

20. A device for impregnating fibrous material comprising:
- a fibrous material;
- an impregnating agent;
- a supply body having apertures for the supply of the impregnating agent;
- a transport means for moving the fibrous material through the device and respectively past the supply body, and
- a supply means for supplying impregnating agent to the supply body,
- wherein the supply body is composed of a substantially homogeneous, porous body which is permeable to the impregnating agent, wherein the porous body is provided so that the surface of the porous body comes into contact with the fibrous material, wherein the flow resistance of the supply body for the impregnating agent is greater than the flow resistance of the fibrous material perpendicular to the contact surface of the supply body.

21. A device according to claim 20 wherein the flow resistance of the supply body for the impregnating agent is greater than the flow resistance of the fibrous material perpendicular to the contact surface of the supply body.

22. A device according to claim 20 wherein the length of the porous body in the direction of movement of the fibrous material, is at least 5 mm.

23. A device according to claim 20 wherein the surface of the porous body is configured as a low fiction surface for the fibrous material.

24. A device according to claim 23 wherein the contact surface of the supply body is polished.

25. A device according to claim 23 wherein the contact surface of the supply body is coated with a slip material, for example is galvanized.

26. A device according to claim 20 wherein the thickness of the porous material is large compared to the thickness of the fibrous material and preferably at least double it.

27. A device according to claim 20 wherein a hollow body to which impregnating fluid can be applied from the outside is provided.

28. A device according to claim 27 wherein the hollow body has a convexly curved intake aperture in the direction in which the fibers run.

29. A device according to claim 20 wherein the contract surface of the porous body is convexly curved.

30. A device according to claim 20 wherein the contact surface of the supply body is configured at least in part as a cylindrical surface.

31. A device according to claim 29, wherein the impregnating fluid is applied to the impregnating apparatus(es) by means of at least one rotary transmission.

32. A device according to claim 20 wherein downstream of the supply body, wiping means are provided on one or both sides of the fibrous material.

33. A device according to claim 20 wherein the supply body and respectively its contact surface, in configured to move in the direction of the fibrous material at a speed which differs from the speed of movement of the fibrous material.

34. A device according to claim 20 wherein the permeable body is composed of a multi-layered woven textile, wherein the diameter of the apertures in the individual layers of textile is up to 3 mm.

35. A device according to claim 20 wherein the porous or respectively permeable body has a length to diameter of the fluid supply channels ratio which is in the range of 0.1 to 1000, preferably from 1 to 1000, and in particular in the range of 10 to 500.

36. A device according to claim 20 wherein said fibrous material is selected from the group consisting of fiber bundles, fiber strand, woven textile, and fiber mates.

37. A device for impregnating fibrous material comprising:
- a fibrous material;
- an impregnating agent;
- a supply body having apertures for the supply of the impregnating agent;

a transport means for moving the fibrous material through the device and respectively past the supply body;

a supply means for supplying impregnating agent to the supply body, wherein the supply body is composed of a substantially homogeneous, porous body which is permeable to the impregnating agent, wherein the porous body is provided so that the surface of the porous body comes into contact with the fibrous material; and a feed means for a blank mold moveable in the longitudinal direction relative to the impregnating device, to which mold impregnated fibers are to be applied.

38. A device for impregnating fibrous material comprising:

a fibrous material;

an impregnating agent;

a supply body having apertures for the supply of the impregnating agent;

a transport means for moving the fibrous material through the device and respectively past the supply body;

a supply means for supplying impregnating agent to the supply body, wherein the supply body is composed of a substantially homogeneous, porous body which is permeable to the impregnating agent, wherein the porous body is provided so that the surface of the porous body comes into contact with the fibrous material;

a feed means for a blank mold moveable in the longitudinal direction relative to the impregnating device, to which mold impregnated fibers are to be applied; and a rotation device provided for a blank mold, which provides rotation of the blank mold relative to the impregnating means for the fibers.

39. A device for impregnating fibrous material comprising:

a fibrous material;

an impregnating agent;

a supply body having apertures for the supply of the impregnating agent;

a transport means for moving the fibrous material through the device and respectively past the supply body, a supply means for supplying impregnating agent to the supply body, wherein the supply body is composed of a substantially homogeneous, porous body which is permeable to the impregnating agent, wherein the porous body is provided so that the surface of the porous body comes into contact with the fibrous material;

a feed means for a blank mold moveable in the longitudinal direction relative to the impregnating device, to which mold impregnated fibers are to be applied; and an impregnating means is arranged to be rotatable together with a fiber supply means about the blank mold.

40. A device for impregnating fibrous material comprising:

a fibrous material;

an impregnating agent;

a supply body having apertures for the supply of the impregnating agent;

a transport means for moving the fibrous material through the device and respectively past the supply body;

a supply means for supplying impregnating agent to the supply body, wherein the supply body is composed of a substantially homogeneous, porous body which is permeable to said impregnating agent, wherein the porous body is provided so that the surface of the porous body comes into contact with the fibrous material;

a feed means for a blank mold moveable in the longitudinal direction relative to the impregnating device, to which mold impregnated fibers are to be applied;

an impregnating means is arranged to be rotatable together with a fiber supply means about the blank mold; and a plurality of fiber supply means rotatable independently or together about a blank mold.

41. A device for impregnating fibrous material comprising:

a fibrous material;

an impregnating agent;

a supply body having apertures for the supply of the impregnating agent;

a transport means for moving the fibrous material through the device and respectively past the supply body;

a supply means for supplying impregnating agent to the supply body, wherein the supply body is composed of a substantially homogeneous, porous body which is permeable to said impregnating agent, wherein the porous body is provided so that the surface of the porous body comes into contact with the fibrous material;

a feed means for a blank mold moveable in the longitudinal direction relative to the impregnating device, to which mold impregnated fibers are to be applied; and an impregnating means is arranged to be rotatable together with a fiber supply means about the blank mold, wherein the fiber supply means each have a separate impregnating means rotatable with the fiber supply means.

42. A device for impregnating fibrous material comprising:

a fibrous material;

an impregnating agent;

a supply body having apertures for the supply of the impregnating agent;

a transport means for moving the fibrous material through the device and respectively past the supply body;

a supply means for supplying impregnating agent to the supply body, wherein the supply body is composed of a substantially homogeneous, porous body which is permeable to said impregnating agent, wherein the porous body is provided so that the surface of the porous body comes into contact with the fibrous material;

a feed means for a blank mold moveable in the longitudinal direction relative to the impregnating device, to which mold impregnated fibers are to be applied;

an impregnating means is arranged to be rotatable together with a fiber supply means about the blank mold; and a plurality of fiber supply means rotatable independently or together about a blank mold, wherein the fiber supply means are provided with a common impregnating means.

* * * * *

UNITED STATES PATENT AND TRADEMARK OFFICE
CERTIFICATE OF CORRECTION

PATENT NO.    : 6,530,246 B1
DATED         : March 11, 2003
INVENTOR(S)   : Joachim Hausmann It is certified that error appears in the above-identified patent and that said Letters Patent is hereby corrected as shown below:

Column 11,
Line 60, "an impregnating agents" should be -- an impregnating agent --

Column 12,
Line 62, "takes place via aperture" should be -- takes place via apertures --

Signed and Sealed this

Twenty-fourth Day of June, 2003

JAMES E. ROGAN
*Director of the United States Patent and Trademark Office*